US011218309B2

(12) United States Patent
Nakagawa

(10) Patent No.: US 11,218,309 B2
(45) Date of Patent: Jan. 4, 2022

(54) VEHICLE COMMUNICATION SYSTEM AND VEHICLE COMMUNICATION METHOD

(71) Applicant: Toyota Jidosha Kabushiki Kaisha, Toyota (JP)

(72) Inventor: Masashi Nakagawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 246 days.

(21) Appl. No.: 16/362,989

(22) Filed: Mar. 25, 2019

(65) Prior Publication Data

US 2019/0305939 A1 Oct. 3, 2019

(30) Foreign Application Priority Data

Mar. 27, 2018 (JP) .............................. JP2018-060400

(51) Int. Cl.
*H04L 29/06* (2006.01)
*H04L 9/08* (2006.01)
*H04W 12/04* (2021.01)

(52) U.S. Cl.
CPC ............. *H04L 9/088* (2013.01); *H04W 12/04* (2013.01)

(58) Field of Classification Search
CPC ..... H04L 9/088; H04L 2209/84; H04L 9/006; H04L 63/0428; H04L 63/061; H04W 12/04; H04W 4/44; H04W 4/48; H04W 12/03; H04W 12/009; H04W 12/069
See application file for complete search history.

(56) References Cited

U.S. PATENT DOCUMENTS

| 8,079,118 | B2* | 12/2011 | Gelvin | H04L 67/12 |
| | | | | 26/26 |
| 9,998,451 | B2* | 6/2018 | Menzel | H04L 67/12 |
| 10,708,062 | B2* | 7/2020 | Hakuta | H04L 9/3247 |
| 10,885,723 | B2* | 1/2021 | Nakagawa | H04L 63/0823 |
| 2005/0041813 | A1* | 2/2005 | Forest | G07C 9/00182 |
| | | | | 380/262 |
| 2005/0203673 | A1* | 9/2005 | El-Hajj | G06Q 10/08 |
| | | | | 701/1 |
| 2005/0251604 | A1* | 11/2005 | Gerig | H04L 67/12 |
| | | | | 710/120 |
| 2006/0106508 | A1* | 5/2006 | Liebl | G07C 5/008 |
| | | | | 701/31.4 |
| 2008/0056495 | A1* | 3/2008 | Eguchi | G07B 15/063 |
| | | | | 380/270 |

(Continued)

FOREIGN PATENT DOCUMENTS

JP 2013-201510 A 10/2013

*Primary Examiner* — Hee K Song
*Assistant Examiner* — Hassan A Hussein
(74) *Attorney, Agent, or Firm* — Dinsmore & Shohl LLP

(57) ABSTRACT

An onboard device transfers an encrypted message encrypted outside a vehicle to one or more vehicle controllers connected to a vehicle network. When the encrypted message is an individual message to one of the vehicle controllers, the onboard device transmits the encrypted message to the one of the vehicle controllers via the vehicle network. When the encrypted message is a common message to the one or more vehicle controllers, the onboard device decrypts the encrypted message using an encryption key owned by the onboard device and then transmits the decrypted message to the one or more vehicle controllers via the vehicle network.

9 Claims, 6 Drawing Sheets

(56) References Cited

U.S. PATENT DOCUMENTS

| | | | |
|---|---|---|---|
| 2010/0023776 A1* | 1/2010 | Fedronic | H04L 9/0825 713/176 |
| 2010/0148923 A1* | 6/2010 | Takizawa | G07C 9/00571 340/5.82 |
| 2012/0302265 A1* | 11/2012 | Lei | H04L 63/0823 455/466 |
| 2013/0173112 A1* | 7/2013 | Takahashi | H04W 12/04 701/36 |
| 2013/0219170 A1* | 8/2013 | Naitou | H04L 63/0471 713/153 |
| 2014/0073254 A1* | 3/2014 | Ichihara | H04W 12/033 455/41.2 |
| 2014/0079217 A1* | 3/2014 | Bai | H04W 12/50 380/270 |
| 2014/0317729 A1 | 10/2014 | Naitou et al. | |
| 2015/0020152 A1* | 1/2015 | Litichever | G06F 21/604 726/1 |
| 2015/0066239 A1* | 3/2015 | Mabuchi | H04L 63/1408 701/1 |
| 2015/0095997 A1* | 4/2015 | Mabuchi | H04L 63/08 726/6 |
| 2015/0163306 A1* | 6/2015 | Nakagawa | B60R 25/24 709/225 |
| 2015/0264017 A1* | 9/2015 | Saed | H04L 67/125 380/270 |
| 2015/0350176 A1* | 12/2015 | Mabuchi | H04L 67/12 726/6 |
| 2016/0080340 A1* | 3/2016 | Oba | H04L 9/0833 713/176 |
| 2016/0094964 A1* | 3/2016 | Barfield, Jr. | G08B 25/016 455/404.2 |
| 2017/0032670 A1* | 2/2017 | Poornachandran | G08G 1/096775 |
| 2017/0070488 A1* | 3/2017 | Jun | H04L 63/061 |
| 2017/0072875 A1* | 3/2017 | Kim | H04H 20/12 |
| 2017/0085537 A1* | 3/2017 | Benedek | H04L 63/062 |
| 2017/0111177 A1* | 4/2017 | Oguma | H04L 67/12 |
| 2017/0134164 A1* | 5/2017 | Haga | G06F 21/572 |
| 2017/0149950 A1* | 5/2017 | Wakita | H04W 4/48 |
| 2017/0302452 A1* | 10/2017 | Nanjundappa | H04W 12/03 |
| 2017/0324558 A1* | 11/2017 | Takemori | H04L 9/3226 |
| 2017/0331637 A1* | 11/2017 | Lu | H04L 63/1408 |
| 2017/0366520 A1* | 12/2017 | Templin | H04L 9/3268 |
| 2017/0369056 A1* | 12/2017 | Arai | G08G 1/0969 |
| 2017/0369072 A1* | 12/2017 | Huber | B60W 30/09 |
| 2018/0148006 A1* | 5/2018 | Haga | H04L 12/40006 |
| 2018/0183710 A1* | 6/2018 | Nakagawa | H04L 45/42 |
| 2018/0183773 A1* | 6/2018 | Nakagawa | H04L 63/062 |
| 2018/0196660 A1* | 7/2018 | Rivas Silva | H04L 67/34 |
| 2018/0205729 A1* | 7/2018 | Carlesimo | H04L 63/123 |
| 2018/0219943 A1* | 8/2018 | Gummig | H04L 67/104 |
| 2018/0270052 A1* | 9/2018 | Cullen | H04L 63/18 |
| 2019/0058613 A1* | 2/2019 | Maeda | H04L 12/40006 |
| 2019/0173951 A1* | 6/2019 | Sumcad | H04W 4/40 |
| 2019/0268420 A1* | 8/2019 | Acharya | H04L 63/0823 |
| 2019/0354725 A1* | 11/2019 | Lowagie | G06F 21/64 |
| 2020/0211301 A1* | 7/2020 | Zhang | H04L 63/126 |
| 2020/0366479 A1* | 11/2020 | Lee | H04L 9/088 |
| 2021/0004146 A1* | 1/2021 | Linville | G06F 3/011 |
| 2021/0004433 A1* | 1/2021 | Ayloo | G06F 40/166 |

\* cited by examiner

VEHICLE COMMUNICATION SYSTEM AND VEHICLE COMMUNICATION METHOD

CROSS-REFERENCE TO RELATED APPLICATIONS

This application claims priority to Japanese Patent Application No. 2018-060400 filed on Mar. 27, 2018, incorporated herein by reference in its entirety.

BACKGROUND

The present disclosure relates to a vehicle communication system and a vehicle communication method for transmitting and receiving an encrypted message.

Japanese Laid-Open Patent Publication No. 2013-201510 describes an example of such a vehicle communication system. In this system, a device for relaying data from one node to another node centrally manages whether or not to encrypt a message. The message encryption is managed in a unit of a combination of a bus connected to a transmission-side node and a bus connected to a reception-side node. Thus, the nodes do not need to have a message encryption function. This reduces the load on the nodes and increases the security of data communication.

SUMMARY

However, in the system described in the above-described document, when the reception-side node is configured by nodes connected to a vehicle network, a predetermined node receives an encrypted message via the vehicle network and decrypts the received message. The predetermined node sequentially transfers the decrypted message to other nodes via the vehicle network. That is, when the encrypted message is shared between the nodes connected to the vehicle network, the same message before and after the decryption is doubly transmitted to the vehicle network. This increases the communication load on the vehicle network.

It is an object of the present disclosure to provide a vehicle communication system and a vehicle communication method for reducing the communication load on a vehicle network by avoiding double transmission of a message before and after decryption to the vehicle network.

The examples of the present disclosure will now be described.

Example 1: A vehicle communication system is provided. The vehicle communication system includes an onboard device and one or more vehicle controllers connected to a vehicle network. The onboard device is configured to transfer an encrypted message encrypted outside a vehicle to the one or more vehicle controllers connected to the vehicle network, when the encrypted message is an individual message to one of the vehicle controllers, transmit the encrypted message to the one of the vehicle controllers via the vehicle network, and when the encrypted message is a common message to the one or more vehicle controllers, decrypt the encrypted message using an encryption key owned by the onboard device and then transmit the decrypted message to the one or more vehicle controllers via the vehicle network.

The above-described configuration avoids double transmission of the same message before and after decryption to the vehicle network and thus reduces the communication load on the vehicle network.

Example 2: In the vehicle communication system according to Example 1, the attribute information related to a message destination may be attached to the encrypted message and that the onboard device may be configured to determine a destination of the encrypted message based on the attribute information.

The above-described configuration allows for determination of whether the encrypted message is an individual message to each ECU or a common message to the ECUs without decrypting the encrypted message.

Example 3: In the vehicle communication system according to Example 1 or 2, the vehicle communication system may further include a communication device that receives the encrypted message from outside the vehicle and a communication line that connects the onboard device to the communication device. The communication line differs from the vehicle network.

With the above-described configuration, the encryption key managed by the onboard device can be shared with the communication device without using the vehicle network. This increases the security of the system.

Example 4: In the vehicle communication system according to any one of Examples 1 to 3, the vehicle communication system may further include a network management device that manages communication of the encrypted message via the vehicle network and that the network management device be configured to share the encryption key with the onboard device through authentication between the network management device and the onboard device.

With the above-described configuration, the onboard device obtains the encryption key, which is used to decrypt the encrypted message, through authentication between the onboard device and the network management device. Thus, when the onboard device is connected to the vehicle network in an unauthorized manner, the onboard device cannot decrypt the encrypted message. This increases the security of the system.

Example 5: In the vehicle communication system according to Example 4, the vehicle network may include a first vehicle network connected to the onboard device and a second vehicle network connected to the onboard device via the network management device. The network management device may also be configured to, when receiving the encrypted message of which a destination is a vehicle controller connected to the second vehicle network, transmit the encrypted message to the vehicle controller via the second vehicle network. The network management device may also be configured to, when receiving the encrypted message of which destinations are one or more vehicle controllers connected to the second vehicle network, decrypt the encrypted message using the encryption key owned by the network management device and then transmit the decrypted message to the one or more vehicle controllers connected to the second vehicle network via the second vehicle network.

When the onboard device transmits the encrypted message to the onboard controller connected to the second communication bus, the onboard device transmits the encrypted message to the network management device via the first communication bus without decrypting the encrypted message. Thus, an onboard device connected to the first communication bus in an unauthorized manner cannot obtain the content of the encrypted message. This increases the security of the system.

Example 6: A vehicle communication method for executing the processes described in Examples 1 to 5 is provided.

Example 7: A non-transitory computer-readable storage medium that stores a program causing a processor to execute the processes described in examples 1 to 5 is provided.

Other aspects and advantages of the present disclosure will become apparent from the following description, taken in conjunction with the accompanying drawings, illustrating by way of example the principles of the disclosure.

BRIEF DESCRIPTION OF THE DRAWINGS

The disclosure, together with objects and advantages thereof, may best be understood by reference to the following description of the embodiments together with the accompanying drawings in which.

DETAILED DESCRIPTION

First Embodiment

A vehicle communication system according to a first embodiment of the present disclosure will now be described with reference to FIGS. 1 to 4.

The vehicle communication system of the present embodiment includes an information center located outside the vehicle. The information center uses an encryption key for encrypted communication with a relay (onboard device) to encrypt a message. The relay transfers the encrypted message to ECUs (vehicle controllers) connected to a first communication bus (vehicle network).

Figure 1:
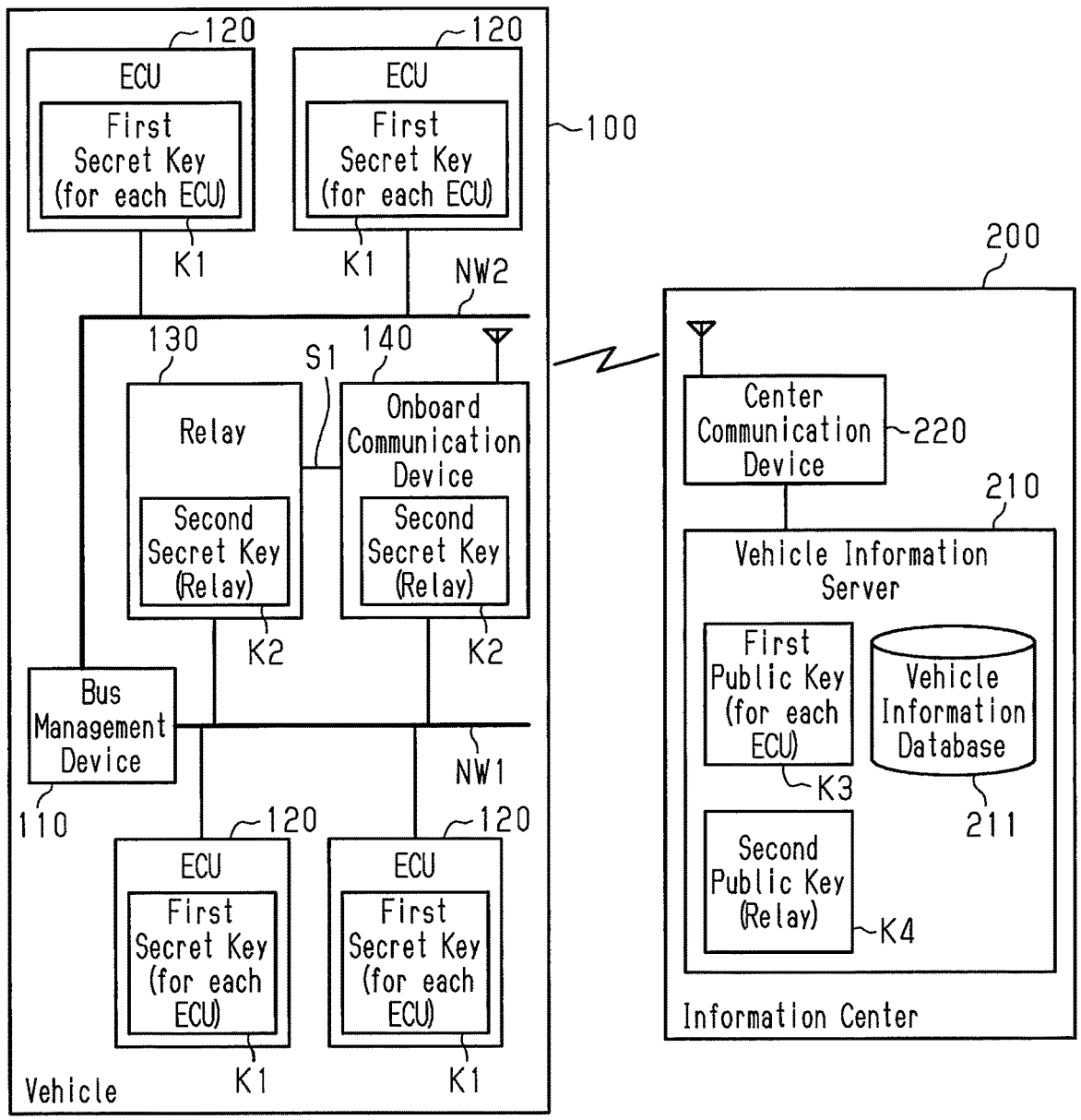
FIG. 1 is a block diagram illustrating the schematic configuration of a vehicle communication system according to a first embodiment of the present disclosure.

More specifically, as shown in FIG. 1, a vehicle 100 includes a bus management device 110, ECUs 120, an onboard communication device 140, and a relay 130.

The bus management device 110 controls transmission and reception of communication data via communication buses NW1 and NW2. The bus management device 110 is connected to a plurality of (two in the example shown in FIG. 1) ECUs 120, the relay 130, and the onboard communication device 140 via the first communication bus NW1. Further, the bus management device 110 is connected to a plurality of (two in the example shown in FIG. 1) ECUs 120 via the communication bus NW2. In the present embodiment, the onboard communication device 140 is connected to the bus management device 110 via the communication bus NW1. That is, the onboard communication device 140 is connected to the communication bus NW2 via the communication bus NW1 and the bus management device 110.

The bus management device 110 acts as a network management device that manages the communication of an encrypted message MS via the communication networks NW1 and NW2.

Each ECU 120 is an electronic controller that performs various types of vehicle control. The ECUs 120 are classified into, for example, a drive ECU 120, an information ECU 120, and a body ECU 120 for each group of the ECUs 120 connected to the same communication buses NW1 and NW2. In addition, each ECU 120 manages (owns) a first secret key K1 as an individual encryption key for the ECU 120.

The relay 130 is connected to the onboard communication device 140, which communicates with the information center 200, via a communication line S1 that differs from the communication bus NW1. The relay 130 manages a second secret key K2 as an encryption key unique to the relay 130.

The onboard communication device 140 obtains, via the communication line S1, the second secret key K2 managed by the relay 130. Further, the onboard communication device 140 obtains, via the communication buses NW1 and NW2, a first public key K3 paired with the first secret key K1 managed by each ECU 120 and a second public key K4 paired with the second secret key K2 managed by the relay 130. Then, the onboard communication device 140 transmits these obtained public keys K3 and K4 to the information center 200 located outside the vehicle.

The information center 200 includes a vehicle information server 210 and a center communication device 220.

The vehicle information server 210 includes a vehicle information database 211 that manages the vehicle information of vehicles 100. The vehicle information includes a preset value used to control the vehicle by each ECU 120, which is installed in the vehicle 100. Further, the vehicle information server 210 manages the public keys K3 and K4 received via the center communication device 220. When transmitting the vehicle information to the vehicle 100, the vehicle information server 210 encrypts the vehicle information read from the vehicle information database 211 using the first public key K3 or the second public key K4 to generate an encrypted message. Then, the vehicle information server 210 transmits the generated encrypted message to the vehicle 100 via the center communication device 220.

Figure 2:
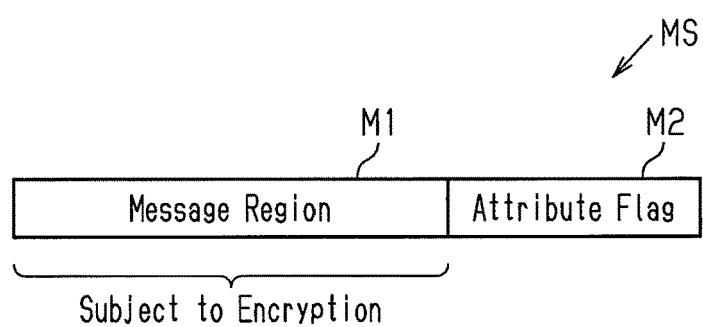
FIG. 2 is a schematic diagram illustrating an example of the data configuration of an encrypted message in the vehicle communication system of FIG. 1.

As shown in FIG. 2, the encrypted message MS includes a message region M1 and an attribute flag M2. The message region M1 includes vehicle information subject to encryption. The attribute flag M2 includes flag information indicating whether the first public key K3 or the second public key K4 has been used to encrypt the encrypted message MS. The attribute flag M2 is excluded from the subject of encryption.

When receiving the encrypted message MS from the information center 200, the onboard communication device 140 reads the flag information included in the attribute flag M2 without decrypting the encrypted message MS. Further, the onboard communication device 140 determines the destination of the encrypted message MS based on the flag information read from the encrypted message MS. That is, the attribute flag M2 includes attribute information related to a message destination, and the encrypted message MS includes the attribute flag M2 so that the attribute information related to a message destination is attached to the encrypted message MS.

More specifically, when the encryption key used for encryption is the first public key K3, the onboard communication device 140 determines that the encrypted message MS is an individual message directed to a specific ECU 120.

The onboard communication device 140 transmits the encrypted message MS to the specific ECU 120, which is the destination of the encrypted message MS, via the first communication bus NW1 without decrypting the encrypted message MS. When receiving the encrypted message MS from the onboard communication device 140, the specific ECU 120 decrypts the encrypted message MS using the first secret key K1 managed by the ECU 120 to obtain the vehicle information included in the message region M1.

When the encryption key used for encryption is the second public key K4, the onboard communication device 140 determines that the encrypted message MS is a common message directed to the ECUs 120 connected to the communication buses NW1 and NW2. The onboard communication device 140 decrypts the encrypted message MS using the second secret key K2 managed by the onboard communication device 140 and then transmits the decrypted message to the ECUs 120, which are the destinations of the encrypted message MS, via the first communication bus NW1. When each ECU 120 receives the decrypted message from the onboard communication device 140, the ECU 120 obtains the vehicle information included in the message region M1 of the received message.

The flow of processes for transmitting an individual message to each ECU 120 in the vehicle communication system of the present embodiment will now be described.

Figure 3:
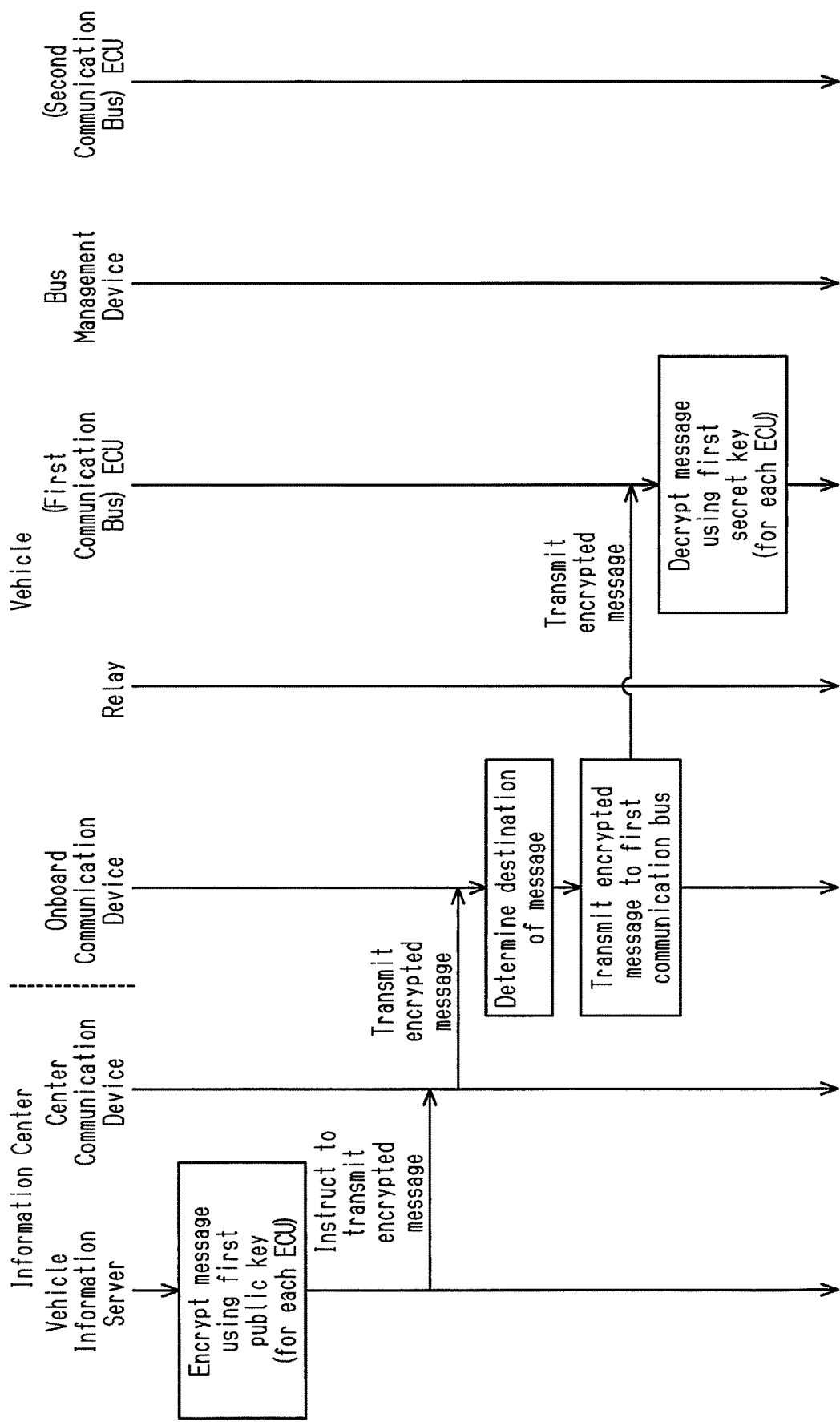
FIG. 3 is a sequence chart illustrating the flow of processes for transmitting an individual message to ECUs in the vehicle communication system of FIG. 1.

As shown in FIG. 3, the vehicle information server 210 first encrypts a message including vehicle information using the first public key K3. Then, the vehicle information server 210 instructs the center communication device 220 to transmit the encrypted message MS.

The center communication device 220 transmits the encrypted message MS to the onboard communication device 140 based on the instruction from the vehicle information server 210.

The onboard communication device 140 determines the destination of the message based on the attribute flag M2 of the encrypted message MS received from the vehicle information server 210. In the example of FIG. 3, the first public key K3 is used for message encryption. Thus, the onboard communication device 140 determines that the destinations of the message are specific ECUs 120 connected to the communication buses NW1 and NW2. The onboard communication device 140 transmits the encrypted message MS to the first communication bus NW1 without decrypting the encrypted message MS.

Each ECU 120 connected to the first communication bus NW1 identifies the destination of the encrypted message MS transmitted to the first communication bus NW1 from the onboard communication device 140. When the ECU 120 identifies that the destination of the encrypted message MS is the ECU 120, the ECU 120 receives the encrypted message MS transmitted to the first communication bus NW1. The ECU 120 obtains the vehicle information included in the encrypted message MS received from the first communication bus NW1 by decrypting the encrypted message MS using the first secret key K1. When the ECU 120 identifies that the destination of the encrypted message MS is not the ECU 120, the ECU 120 discards the encrypted message MS transmitted to the first communication bus NW1.

The flow of processes for transmitting a common message to the ECUs 120 in the vehicle communication system of the present embodiment will now be described.

Figure 4:
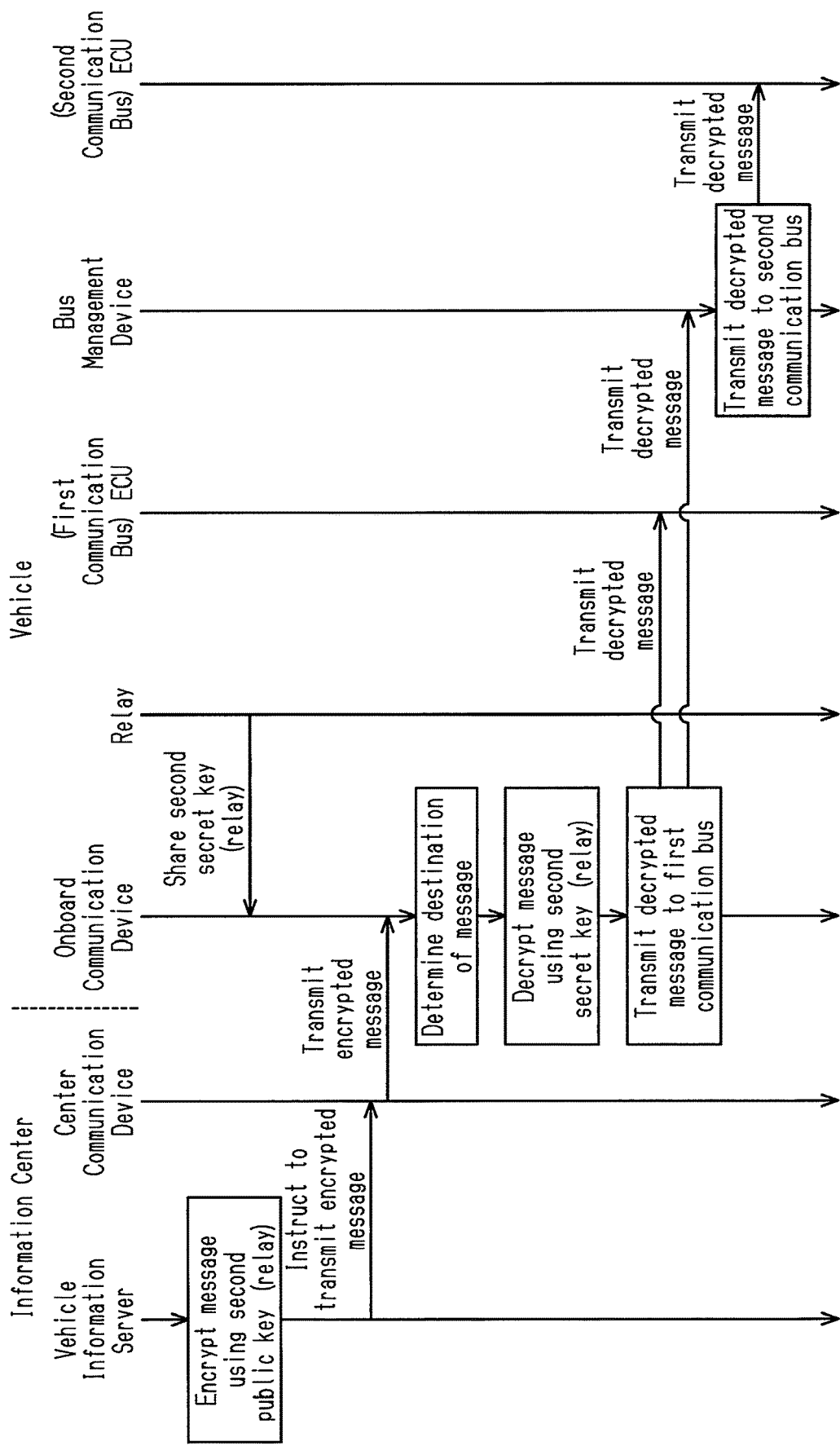
FIG. 4 is a sequence chart illustrating the flow of processes for transmitting a common message to the ECUs in the vehicle communication system of FIG. 1.

As shown in FIG. 4, prior to message transmission, the onboard communication device 140 obtains the second secret key K2 managed by the relay 130 via the communication line S1.

The vehicle information server 210 first encrypts a message including vehicle information using the second public key K4. Then, the vehicle information server 210 instructs the center communication device 220 to transmit the encrypted message MS.

The center communication device 220 transmits the encrypted message MS to the onboard communication device 140 based on the instruction from the vehicle information server 210.

The onboard communication device 140 determines the destination of the message based on the attribute flag M2 of the encrypted message MS received from the vehicle information server 210. In the example of FIG. 4, the second public key K4 is used for message encryption. Thus, the onboard communication device 140 determines that the ECUs 120 connected to the communication buses NW1 and NW2 are the destinations of the message. The onboard communication device 140 decrypts the encrypted message MS using the second secret key K2 and then transmits the decrypted message to the first communication bus NW1.

Each ECU 120 connected to the first communication bus NW1 identifies the destination of the decrypted message transmitted to the first communication bus NW1 from the onboard communication device 140. When the ECU 120 identifies that the destination of the decrypted message is the ECU 120, the ECU 120 receives the decrypted message transmitted to the first communication bus NW1. The ECU 120 obtains the vehicle information included in the decrypted message received from the first communication bus NW1. When the ECU 120 identifies that the destination of the decrypted message is not the ECU 120, the ECU 120 discards the decrypted message transmitted to the first communication bus NW1.

In the same manner, the bus management device 110 connected to the first communication bus NW1 identifies the destination of the decrypted message transmitted to the first communication bus NW1 from the relay 130. When the bus management device 110 identifies that the destination of the decrypted message is the ECU 120 connected to the second communication bus NW2, the bus management device 110 receives the decrypted message transmitted to the first communication bus NW1. The bus management device 110 transmits the decrypted message received from the first communication bus NW1 to the second communication bus NW2. Subsequently, the ECU 120, which is the destination of the decrypted message, receives the decrypted message from the second communication bus NW and obtains the vehicle information included in the received decrypted message. When the bus management device 110 identifies that the destination of the decrypted message is not the ECU 120 connected to the second communication bus NW2, the bus management device 110 discards the decrypted message transmitted to the first communication bus NW1.

The operation of the vehicle communication system of the present embodiment will now be described.

When encryption communication is performed between the information center 200 and the vehicle 100, the encrypted message MS transmitted from the information center 200 may be a common message of which destinations are the ECUs 120 installed in the vehicle 100. In this case, if the same message is doubly transmitted to the communication buses NW1 and NW2 connected to the ECUs 120 before and after decryption, the communication load on the communication buses NW1 and NW2 is heavy. This may result in communication delay and communication error of messages.

In the present embodiment, when the onboard communication device 140 receives the encrypted message MS from the information center 200, the onboard communication device 140 determines whether or not the encrypted message MS is a common message based on the attribute flag attached to the encrypted message MS. When determining that the encrypted message MS is a common message, the onboard communication device 140 decrypts the encrypted message MS and then transmits the decrypted message to the first communication bus NW1. This avoids double transmission of the same message before and after decryption to the communication buses NW1 and NW2 and thus reduces the communication delay and communication errors of messages.

As described above, the first embodiment has the following advantages.

(1) The same message before and after decryption of the encrypted message MS received from outside the vehicle is prevented from being doubly transmitted to the communication buses NW1 and NW2. This reduces the communication load on the communication buses NW1 and NW2.

(2) The attribute flag M2, which is related to a message destination, is attached to the encrypted message MS. This allows the onboard communication device 140 to determine whether the encrypted message MS is an individual message to each ECU 120 or a common message to the ECUs 120 without decrypting the encrypted message MS.

(3) The relay 130 is connected to the onboard communication device 140, which receives the encrypted message MS from outside the vehicle, via the communication line S1, which differs from the communication bus NW1. Thus, the second secret key K2 managed by the relay 130 can be shared with the onboard communication device 140 without using the first communication bus NW1. This increases the security of the system.

Second Embodiment

A vehicle communication system according to a second embodiment of the present disclosure will now be described with reference to FIGS. 5 to 7. The second embodiment differs from the first embodiment in an encryption key used to encrypt a common message to ECUs. Thus, the following description focuses on the configuration that differs from the first embodiment. The configuration that is the same as or corresponds to the first embodiment will not be described.

Figure 5:
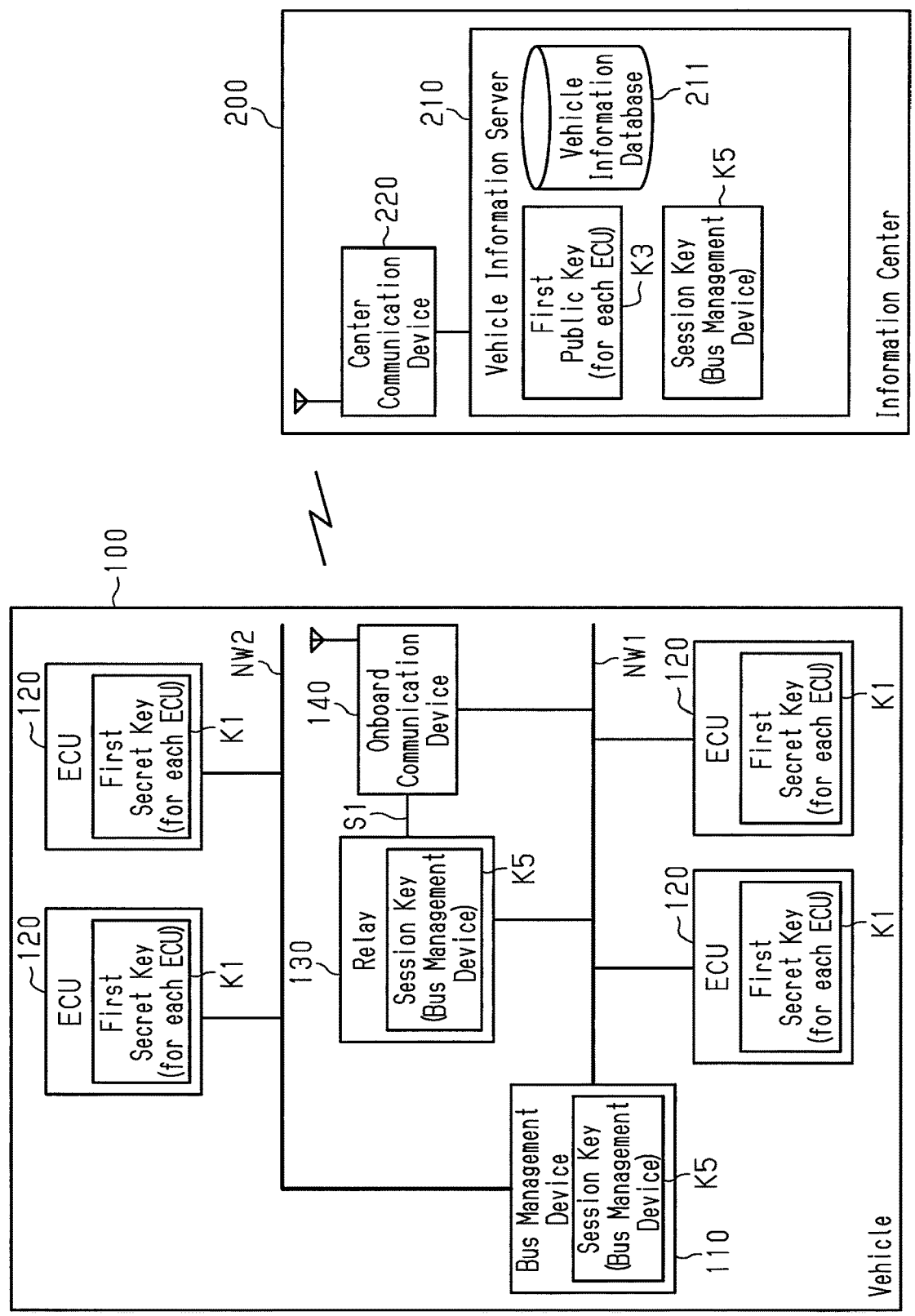
FIG. 5 is a block diagram illustrating the schematic configuration of a vehicle communication system according to a second embodiment.

As shown in FIG. 5, in the present embodiment, the relay 130 shares a session key K5 managed by the bus management device 110 with the bus management device 110 through authentication between the relay 130 and the bus management device 110 prior to receiving the encrypted message MS from the information center 200. Authentication is, for example, of a challenge-response type.

In the same manner, the vehicle information server 210 shares a session key K5 managed by the bus management device 110 with the bus management device 110 through authentication between the relay 130 and the bus management device 110 prior to transmitting the encrypted message MS to the vehicle 100. When transmitting a common message of which destinations are the ECUs 120, the vehicle information server 210 encrypts the message using the session key K5 and then transmits the encrypted message to the vehicle 100.

The onboard communication device 140 transfers the encrypted message MS received from the vehicle information server 210 to the relay 130 via the communication line S1. Then, based on the attribute flag M2 attached to the encrypted message MS received from the onboard communication device 140, the relay 130 determines whether or not the encrypted message MS is a common message of which destinations are the ECUs 120. When determining that the encrypted message MS is the common message, the relay 130 determines whether the destination of the common message is an ECU 120 connected to the first communication bus NW1 or an ECU 120 connected to the second communication bus NW2 based on the attribute flag M2 attached to the encrypted message MS.

When determining that the destination of the common message is the ECU 120 connected to the first communication bus NW1, the relay 130 decrypts the encrypted message MS using the session key K5 managed by the relay 130 and then transmits the decrypted message to the first communication bus NW1.

When the relay 130 selectively determines that the ECU 120 connected to the second communication bus NW2 is the destination of the common message instead of the ECU 120 connected to the first communication bus NW1, the relay 130 transfers the encrypted message MS to the bus management device 110 via the first communication bus NW1 without decrypting the encrypted message MS. The bus management device 110 decrypts the encrypted message MS transferred from the relay 130 using the session key K5 managed by the bus management device 110 and then transmits the decrypted encrypted message MS to the second communication bus NW2.

The flow of processes for transmitting a common message to the ECUs 120 connected to the first communication bus NW1 and the second communication bus NW2 in the vehicle communication system of the present embodiment will now be described.

Figure 6:
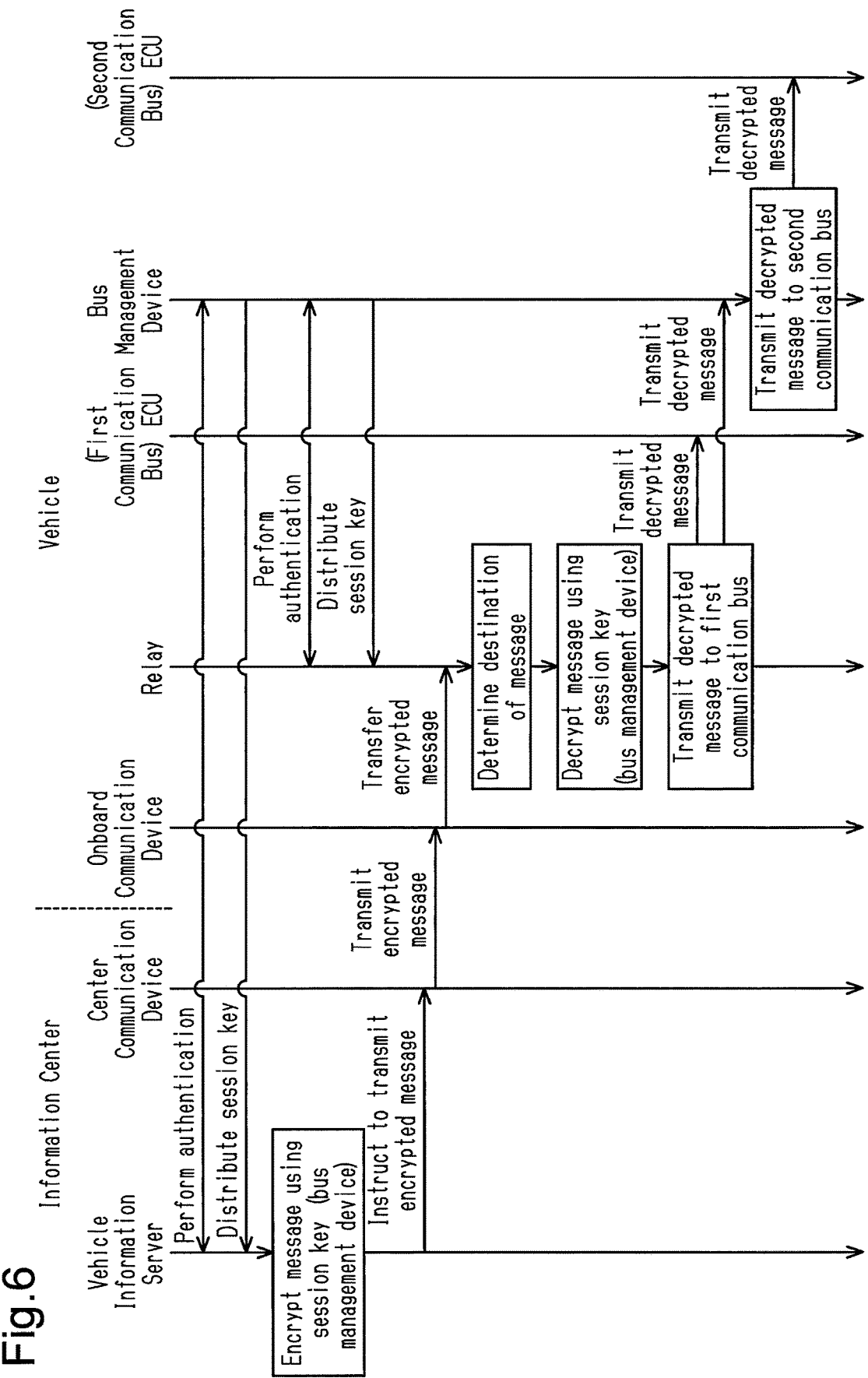
FIG. 6 is a sequence chart illustrating the flow of processes for transmitting a common message to the ECUs connected to a first communication bus and a second communication bus in the vehicle communication system of FIG. 5.

As shown in FIG. 6, in the present embodiment, prior to transmitting the encrypted message MS, the bus management device 110 distributes the session key K5 to the vehicle information server 210 after performing authentication between the bus management device 110 and the vehicle information server 210. Further, the bus management device 110 distributes the session key K5 to the relay 130 after performing authentication between the bus management device 110 and the relay 130.

The vehicle information server 210 encrypts a message including vehicle information using the session key K5 distributed from the bus management device 110. Then, the vehicle information server 210 instructs the center communication device 220 to transmit the encrypted message MS.

The center communication device 220 transmits the encrypted message MS to the onboard communication device 140 based on the instruction from the vehicle information server 210.

The onboard communication device 140 transfers the encrypted message MS received from the vehicle information server 210 to the relay 130 via the communication line S1.

The relay 130 determines the destination of the message based on the attribute flag M2 of the encrypted message MS received from the onboard communication device 140. In the example shown in FIG. 6, the relay 130 determines that the destinations of the message are the ECUs 120 connected to the first communication bus NW1 and the second communication bus NW2. The relay 130 decrypts the encrypted message MS using the session key K5 and then transmits the decrypted message to the first communication bus NW1.

Each ECU 120 connected to the first communication bus NW1 identifies the destination of the decrypted message transmitted from the relay 130. When the ECU 120 identifies that the destination of the decrypted message is the ECU 120, the ECU 120 receives the decrypted message transmitted to the first communication bus NW1. The ECU 120 obtains the vehicle information included in the decrypted message received from the first communication bus NW1. When the ECU 120 identifies that the destination of the decrypted message is not the ECU 120, the ECU 120 discards the decrypted message transmitted to the first communication bus NW1.

In the same manner, the bus management device 110 connected to the first communication bus NW1 identifies the destination of the decrypted message transmitted to the first communication bus NW1 from the relay 130. When the bus management device 110 determines that the destination of the decrypted message is the ECU 120 connected to the second communication bus NW2, the bus management device 110 receives the decrypted message transmitted to the first communication bus NW1. The bus management device 110 transmits the decrypted message received from the first communication bus NW1 to the second communication bus NW2. Subsequently, each ECU 120 connected to the second communication bus NW2 receives the decrypted message from the second communication bus NW2 and obtains the vehicle information included in the received decrypted message.

The flow of processes for transmitting a common message to the ECUs 120 connected to the second communication bus NW2 in the vehicle communication system of the present embodiment will now be described.

Figure 7:
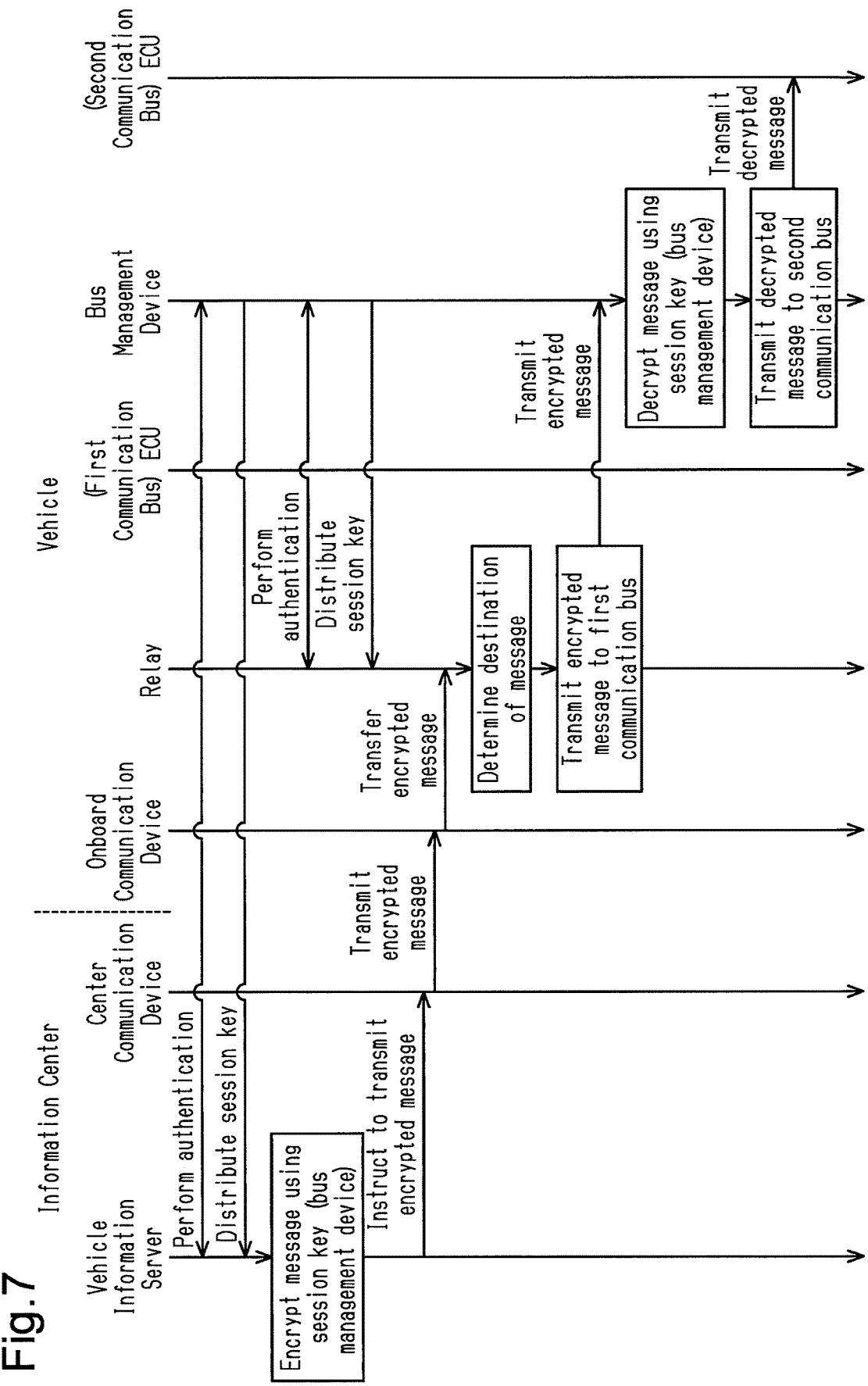
FIG. 7 is a sequence chart illustrating the flow of processes for transmitting a common message to the ECUs connected to the second communication bus in the vehicle communication system of FIG. 5.

As shown in FIG. 7, in the present embodiment, prior to transmitting the encrypted message MS, the bus management device 110 distributes the session key K5 to the vehicle information server 210 after performing authentication between the bus management device 110 and the vehicle information server 210. Further, the bus management device 110 distributes the session key K5 to the relay 130 after performing authentication between the bus management device 110 and the relay 130.

The vehicle information server 210 encrypts a message including vehicle information using the session key K5 distributed from the bus management device 110. Then, the vehicle information server 210 instructs the center communication device 220 to transmit the encrypted message MS.

The center communication device 220 transmits the encrypted message MS to the onboard communication device 140 based on the instruction from the vehicle information server 210.

The onboard communication device 140 transfers the encrypted message MS received from the vehicle information server 210 to the relay 130 via the communication line S1.

The relay 130 determines the destination of the message based on the attribute flag M2 of the encrypted message MS received from the onboard communication device 140. In the example shown in FIG. 7, the relay 130 determines that the destinations of the message are the ECUs 120 connected to the second communication bus NW2. The relay 130 transmits the encrypted message MS to the first communication bus NW1 without decrypting the encrypted message MS.

The bus management device 110 identifies the destination of the encrypted message MS transmitted from the relay 130 to the first communication bus NW1. When the ECU 120 identifies that the destination of the encrypted message MS is the ECU 120 connected to the second communication bus NW2, the bus management device 110 receives the encrypted message MS transmitted to the first communication bus NW1. The bus management device 110 decrypts the encrypted message MS using the session key K5 and then transmits the decrypted message to the second communication bus NW2. Subsequently, each ECU 120 connected to the second communication bus NW2 receives the decrypted message from the second communication bus NW2 and obtains the vehicle information included in the received decrypted message.

As described above, the second embodiment has the following advantages in addition to advantages (1) to (3) of the first embodiment.

(4) The relay 130 obtains the session key K5, which is used to decrypt the encrypted message MS, through authentication between the relay 130 and the bus management device 110. Thus, when a relay is connected to the first communication bus NW1 in an unauthorized manner, the relay cannot decrypt the encrypted message MS. This increases the security of the system.

(5) When the relay 130 transmits the encrypted message MS to the ECU 120 connected to the second communication bus NW2, the relay 130 transmits the encrypted message MS to the bus management device 110 via the first communication bus NW1 without decrypting the encrypted message MS. Thus, the relay 130 connected to the first communication bus NW1 in an unauthorized manner cannot obtain the content of the encrypted message MS. This increases the security of the system.

Other Embodiments

It should be apparent to those skilled in the art that the present disclosure may be embodied in many other specific forms without departing from the spirit or scope of the disclosure. Particularly, it should be understood that the present disclosure may be embodied in the following forms.

In the second embodiment, when the relay 130 transmits the encrypted message MS to the ECU 120 connected to the second communication bus NW2, the relay 130 transmits the encrypted message MS to the bus management device 110 via the first communication bus NW1 without decrypting the encrypted message MS. Instead, even when the relay 130 transmits the encrypted message MS to the ECU 120 connected to the second communication bus NW2, the relay 130 may decrypt the encrypted message MS and then transmit the decrypted message to the bus management device 110 via the first communication bus NW1.

In the second embodiment, the relay 130 obtains the session key K5, which is used to decrypt the encrypted message MS, through authentication between the relay 130 and the bus management device 110. Instead, the relay 130 may share the session key K5 with the bus management device 110 by being connected to the bus management device 110 via a communication line that differs from the first communication bus NW1. Further, the encryption key used to decrypt the encrypted message MS is not necessarily the session key K5 and may be a common key shared between the relay 130 and the bus management device 110.

In the first embodiment, the relay 130 is connected to the onboard communication device 140, which receives the encrypted message MS from outside the vehicle, via the communication line S1, which differs from the communication bus NW1. Instead, the second secret key K2 managed by the relay 130 may be shared between the relay 130 and the onboard communication device 140 by performing authentication between the relay 130 and the onboard communication device 140 via the first communication bus NW1.

In each of the above embodiments, the attribute flag M2 related to a message destination is attached to the encrypted message MS. Instead, the information related to a message destination may be included in the message region M1 subject to encryption of the encrypted message MS. In this case, the destination of the message may be determined after decrypting the encrypted message, and the message may be encrypted again if necessary.

In the first embodiment, the onboard communication device 140 determines the destination of the encrypted message MS. Instead, the relay 130 may determine the destination of the encrypted message MS received from outside the vehicle after transferring the encrypted message MS from the onboard communication device 140 via the communication line S1.

In each of the above-described embodiments, the onboard communication device 140 is separate from the relay 130. Instead, the onboard communication device 140 may be integrated with the relay 130. In the same manner, the bus management device 110 may be integrated with the onboard communication device 140.

In each of the above-described embodiments, the public key encryption mode is employed for message encryption. Instead, a common key encryption mode may be employed for message encryption. Alternatively, the public key encryption mode and the common key encryption mode may be combined.

In each of the above-described embodiments, the controller that executes various types of processes performed by the bus management device 110, the onboard communication device 140, and the relay 130 include the CPU and the ROM to execute software processing. However, the configuration is not limited in such a manner. Instead, for example, at least part of the processes executed by the software in the above-described embodiments may be executed by hardware circuits dedicated to executing these processes (such as ASIC). That is, the controller may be modified as long as it has any one of the following configurations (a) to (c). (a) A configuration including a processor that executes all of the above-described processes according to programs and a program storage device such as a ROM (including a non-transitory computer readable medium) that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. A plurality of software processing circuits each including a processor and a program storage device and a plurality of dedicated hardware circuits may be provided. That is, the above processes may be executed in any manner as long as the processes are executed by processing circuitry that includes at least one of a set of one or more software processing circuits and a set of one or more dedicated hardware circuits.

Therefore, the present examples and embodiments are to be considered as illustrative and not restrictive and the disclosure is not to be limited to the details given herein, but may be modified within the scope and equivalence of the appended claims.

The invention claimed is:

1. A vehicle communication system comprising:
an onboard device; and
one or more vehicle controllers connected to a vehicle network, wherein the onboard device is configured to:
   transfer an encrypted message encrypted outside a vehicle to the one or more vehicle controllers connected to the vehicle network, the encrypted message encrypted outside the vehicle originates from a vehicle information server, an attribute flag is attached the encrypted message and is set by the vehicle information server, the attribute flag includes an attribute information related to a destination of the encrypted message;
   determine the destination of the encrypted message based on the attribute information without decrypting the encrypted message and whether the encrypted message is an individual message or a common message before transmitting the encrypted message;
   when the encrypted message is the individual message to one of the one or more vehicle controllers, transmit the encrypted message to the one of the one or more vehicle controllers via the vehicle network;
   when the encrypted message is the common message to the one or more vehicle controllers, decrypt the encrypted message using an encryption key owned by the onboard device and then transmit the decrypted message to the one or more vehicle controllers via the vehicle network; and
   transmit the encrypted message in an encrypted form when the encrypted message is the individual message.

2. The vehicle communication system according to claim 1, further comprising:
a communication device that receives the encrypted message from outside the vehicle; and
a communication line that connects the onboard device to the communication device, wherein the communication line differs from the vehicle network.

3. The vehicle communication system according to claim 1, further comprising a network management device that manages communication of the encrypted message via the vehicle network, wherein the network management device is configured to share the encryption key with the onboard device through authentication between the network management device and the onboard device.

4. The vehicle communication system according to claim 3, wherein
the vehicle network includes a first vehicle network connected to the onboard device and a second vehicle network connected to the onboard device via the network management device, and
the network management device is configured to:
when receiving the encrypted message of which the destination is a vehicle controller connected to the second vehicle network, transmit the encrypted message to the vehicle controller via the second vehicle network; and
when receiving the encrypted message of which destinations are the one or more vehicle controllers connected to the second vehicle network, decrypt the encrypted message using the encryption key owned by the network management device and then transmit the decrypted message to the one or more vehicle controllers connected to the second vehicle network via the second vehicle network.

5. The vehicle communication system according to claim 1, wherein the attribute information related to the destination further includes information of whether the encrypted message is the individual message or the common message.

6. A vehicle communication method comprising:
transferring an encrypted message encrypted outside a vehicle to one or more vehicle controllers connected to a vehicle network, the encrypted message encrypted outside the vehicle originates from a vehicle information server, an attribute flag is attached the encrypted message and is set by the vehicle information server, the attribute flag includes attribute information related to a destination of the encrypted message;
determining, by an onboard device, the destination of the encrypted message based on the attribute information such that the destination of the encrypted message is determined without decrypting the encrypted message and whether the encrypted message is an individual message or a common message before transmitting the encrypted message;
when the encrypted message is the individual message to one of the one or more vehicle controllers, transmitting, by the onboard device, the encrypted message to the one of the one or more vehicle controllers via the vehicle network in an encrypted form;
when the encrypted message is the common message to the one or more vehicle controllers, decrypting, by the onboard device, the encrypted message using an encryption key owned by the onboard device; and
transmitting, by the onboard device, the decrypted message to the one or more vehicle controllers via the vehicle network.

7. The vehicle communication method according to claim 6, wherein the attribute information related to the destination further includes information of whether the encrypted message is the individual message or the common message.

8. A non-transitory computer-readable storage medium that stores a program causing a processor to execute a vehicle communication process, the vehicle communication process comprising:
transferring an encrypted message encrypted outside a vehicle to one or more vehicle controllers connected to a vehicle network, the encrypted message encrypted outside the vehicle originates from a vehicle information server, an attribute flag is attached the encrypted message and is set by the vehicle information server, the attribute flag includes attribute information related to a destination of the encrypted message;
determining, by an onboard device, the destination of the encrypted message based on the attribute information such that the destination of the encrypted message is determined without decrypting the encrypted message and whether the encrypted message is an individual message or a common message before transmitting the encrypted message;
when the encrypted message is the individual message to one of the one or more vehicle controllers, transmitting, by the onboard device, the encrypted message to the one of the one or more vehicle controllers via the vehicle network in an encrypted form;
when the encrypted message is the common message to the one or more vehicle controllers, decrypting, by the onboard device, the encrypted message using an encryption key owned by the onboard device; and
transmitting, by the onboard device, the decrypted message to the one or more vehicle controllers via the vehicle network.

9. The vehicle communication process according to claim 8, wherein the attribute information related to the destination further includes information of whether the encrypted message is the individual message or the common message.

* * * * *